US012580780B2

(12) United States Patent
Vialar et al.

(10) Patent No.: US 12,580,780 B2
(45) Date of Patent: Mar. 17, 2026

(54) BLOCKCHAIN MONITORING PLATFORM

(71) Applicant: NAGRAVISION SARL,
Cheseaux-sur-Lausanne (CH)

(72) Inventors: Louis Vialar, Fetigny (CH); Nils Amiet, Chavannes-près-Renens (CH); Nathan Hamiel, Jacksonville, FL (US)

(73) Assignee: NAGRAVISION SARL,
Cheseaux-sur-Lausanne (CH)

( * ) Notice: Subject to any disclaimer, the term of this patent is extended or adjusted under 35 U.S.C. 154(b) by 190 days.

(21) Appl. No.: 17/940,687

(22) Filed: Sep. 8, 2022

(65) Prior Publication Data

US 2024/0089128 A1 Mar. 14, 2024

(51) Int. Cl.
*G06F 21/64* (2013.01)
*G06F 21/31* (2013.01)
*G06Q 20/06* (2012.01)
*H04L 9/00* (2022.01)

(52) U.S. Cl.
CPC ............... *H04L 9/50* (2022.05); *G06F 21/31* (2013.01)

(58) Field of Classification Search
None
See application file for complete search history.

(56) References Cited

U.S. PATENT DOCUMENTS

| | | | |
|---|---|---|---|
| 11,315,110 B2 * | 4/2022 | Jayachandran | ....... H04L 9/0618 |
| 2017/0243213 A1 * | 8/2017 | Castinado | ............. H04W 12/06 |
| 2017/0243222 A1 * | 8/2017 | Balasubramanian | ......................... G06Q 20/4014 |
| 2019/0164156 A1 * | 5/2019 | Lindemann | ......... H04L 63/0861 |
| 2020/0127813 A1 * | 4/2020 | Millar | .................. G06Q 20/363 |
| 2020/0186355 A1 * | 6/2020 | Davies | ................ H04L 63/0823 |
| 2020/0242602 A1 * | 7/2020 | Jiang | ........................ G06F 16/27 |
| 2020/0304289 A1 * | 9/2020 | Androulaki | ........... H04L 9/0637 |
| 2021/0211414 A1 * | 7/2021 | Cage | ........................ H04L 63/10 |
| 2021/0248514 A1 * | 8/2021 | Cella | ...................... G06N 3/045 |
| 2022/0147511 A1 * | 5/2022 | Woo | ..................... G06F 16/2365 |
| 2022/0271960 A1 * | 8/2022 | Liu | ............................ H04L 9/50 |

FOREIGN PATENT DOCUMENTS

KR         20200055412 A * 5/2020 ......... G06Q 30/0607

* cited by examiner

*Primary Examiner* — Christopher B Robinson
(74) *Attorney, Agent, or Firm* — POLSINELLI LLP

(57) ABSTRACT

The present disclosure generally relates to a blockchain monitoring system. For example, aspects of the present disclosure include systems and techniques for monitoring one or more transactions on a block chain using configured rules. Some aspects include a monitoring system having at least one memory and at least one processor coupled to the at least one memory and configured to: detect a block on a blockchain; retrieve, from a rules database, a rule associated with one or more transactions on the block; determine whether the rule applies to one or more transactions on the block; and perform one or more actions associated with the rule using an authentication code associated with a user, the authentication code being different than a private key of the user for accessing the blockchain.

16 Claims, 5 Drawing Sheets

400 ⟶

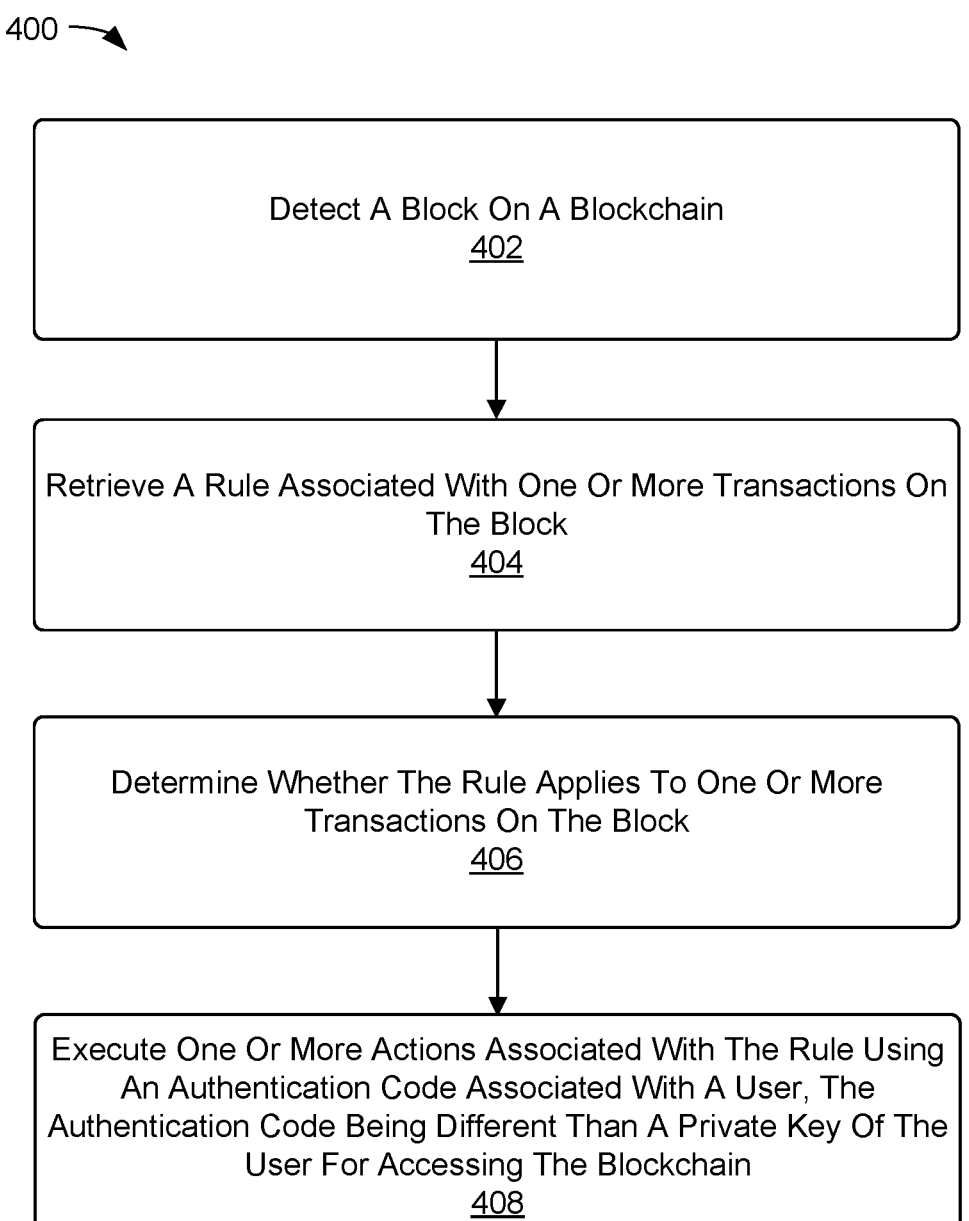

Detect A Block On A Blockchain
402

Retrieve A Rule Associated With One Or More Transactions On The Block
404

Determine Whether The Rule Applies To One Or More Transactions On The Block
406

Execute One Or More Actions Associated With The Rule Using An Authentication Code Associated With A User, The Authentication Code Being Different Than A Private Key Of The User For Accessing The Blockchain
408

FIG. 4

BLOCKCHAIN MONITORING PLATFORM

FIELD

The present disclosure generally relates to a blockchain monitoring system. For example, aspects of the present disclosure include systems and techniques for monitoring one or more transactions on a block chain using configured rules.

BACKGROUND

A blockchain is a decentralised system that maintains an append-only journal of transaction data, typically involving virtual financial assets (crypto-currencies, fungible and non-fungible tokens). The data on a blockchain is stored as discrete blocks, each block containing a reference to the previous block as well as an arbitrary number of transactions, all of that verified and signed by validator nodes.

Some public blockchains attempt to achieve high transaction throughput by producing a new block every few seconds. The blockchain may support a cryptocurrency as well as multiple alternative tokens due to native support for assets defined by third parties. Some blockchains also support smart contracts, which are programs that the nodes on the chain can execute. A typical use case for a smart contract is a decentralized exchange, a platform where people can trade virtual financial assets without centralized intermediaries such as banks.

SUMMARY

Certain aspects of the present disclosure are directed towards a monitoring system. The monitoring system generally includes at least one memory and at least one processor coupled to the at least one memory and configured to: detect a block on a blockchain; retrieve, from a rules database, a rule associated with one or more transactions on the block; determine whether the rule applies to one or more transactions on the block; and perform one or more actions associated with the rule using an authentication code associated with a user, the authentication code being different than a private key of the user for accessing the blockchain.

Certain aspects of the present disclosure are directed towards a method for blockchain monitoring. The method generally includes: detecting a block on a blockchain; retrieving, from a rules database, a rule associated with one or more transactions on the block; determining whether the rule applies to one or more transactions on the block; and performing one or more actions associated with the rule using an authentication code associated with a user, the authentication code being different than a private key of the user for accessing the blockchain.

Certain aspects of the present disclosure are directed towards a non-transitory computer-readable medium having instructions stored thereon, that when executed by one or more processors, cause the one or more processors to: detect a block on a blockchain; retrieve, from a rules database, a rule associated with one or more transactions on the block; determine whether the rule applies to one or more transactions on the block; and perform one or more actions associated with the rule using an authentication code associated with a user, the authentication code being different than a private key of the user for accessing the blockchain.

BRIEF DESCRIPTION OF THE DRAWINGS

Illustrative embodiments of the present application are described in detail below with reference to the following drawing figures:

FIG. 4 illustrates example operations for blockchain monitoring, in accordance with certain aspects of the present disclosure.

DETAILED DESCRIPTION

Figure 1:
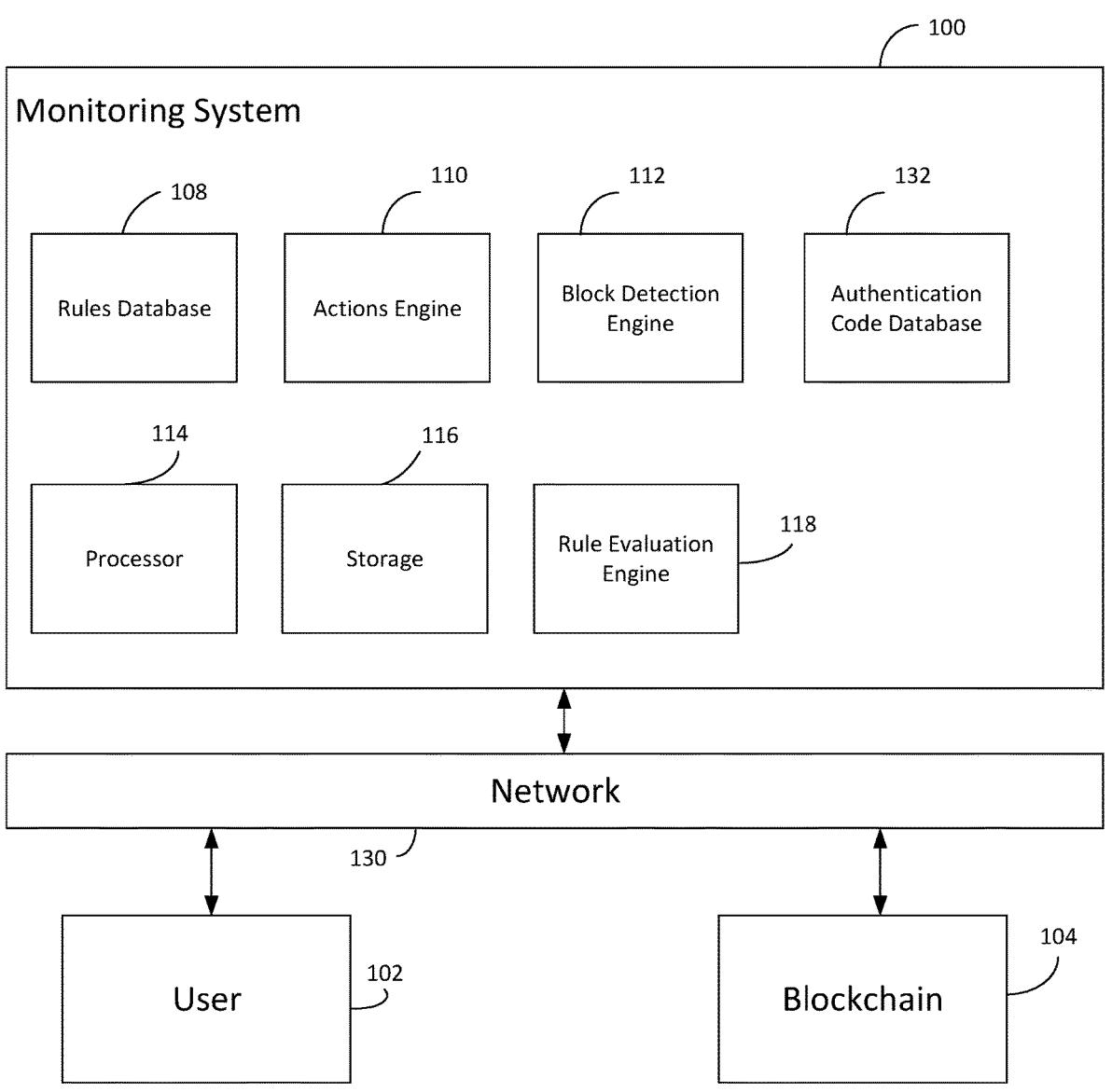
FIG. 1 illustrates an example monitoring system for blockchain monitoring, in accordance with certain aspects of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Certain aspects of the present disclosure provide a blockchain monitoring system (also referred to as a monitoring system) that monitors transactions on a blockchain and implements certain preconfigured actions based on the detection of specific events on the blockchain. The blockchain monitoring system may be used to facilitate further transactions on the blockchain or implement security protocols. When dealing with blockchains and blockchain applications, the effects of transactions are permanent. This permanence is a feature of blockchain. Thus, any attacks on the blockchain are also permanent, and there is no centralized authority to revert transactions or recover funds resulting from such attacks. Blockchain and Web3 applications are emerging technologies and will be associated with more unknown security issues in the future. Therefore, certain aspects of the present disclosure provide a mechanism that proactively constrains the effects of an attack to reduce any incurred damage.

Vulnerabilities and issues manifest themselves in different ways on blockchains. Sometimes, there may be specific security issues, and other times, there may be a violation of business logic that creates the issues. It is not always possible to know the route an attacker will take ahead of time. Due to attacks and business conditions manifesting differently on a per-chain, per-project basis, certain aspects described herein provide a security system configured to perform a validation technique to monitor and detect a set of unique rules for validating transactions and implement actions. Such a validation technique may have an off-blockchain component since anything deployed on-blockchain would be visible to an attacker. Attacks may span multiple transactions and happen at different rates of occurrence. As a result, it may be difficult for a single contract or application to contend with the different transactions since the contract or application only operates on its own set of input data.

According to certain aspects, the monitoring system may address the shortcomings of the blockchain space and traditional monitoring solutions. Some aspects may use a combination of off-chain components for monitoring and on-chain components, such as implementing an authentication code to provide access to manage a blockchain associated with a private key. An authentication code is a concept that allows a blockchain user to sign an authorization to issue a specific command on their behalf. For example, an authentication code may allow a project owner to delegate some functionality to another party monitoring the chain without sharing their private key. The monitoring system proactively determines by pre-defined conditions to take action when an attack is detected. An illustrative example of an action that may be performed in response to a detected attack may be to pause the contract to reduce financial loss or implement a buy/sell order automatically or upon reaching a certain price threshold.

The monitoring system enables users to monitor transactions involving an object on the blockchain by providing specific rules. An object may be a smart contract, identified by its identifier, an account on the blockchain, identified by its address, or a standard asset providing a mechanism to represent any type of asset on the blockchain, identified by its identifier. It can also be a combination of a smart contract, an account on the blockchain, or a standard asset. For instance, the monitoring system may be configured to monitor transactions involving both a specific standard asset and a specific account. One example may be a transaction where a user sends tokens of a specific standard asset. In this case, a rule may be provided that not only checks that the standard asset type is correct but also checks that the receiving account has some properties, such as the account balance.

A rule may be composed of a rule logic. For instance, a rule logic may include a sequence of conditions that are executed to filter transactions. In one illustrative example, a condition included in the rule logic may be whether an amount of cryptocurrency exchanged in a transaction is higher than a threshold amount (e.g., 1000 coins, $1,000 worth of cryptocurrency, etc.). In response to an occurrence of a condition of the rule logic, one or more rule actions may be performed or executed. The rule actions may be a sequence of actions that are executed if a transaction that matches the rule logic is encountered. In some aspects, these actions may be used to alert the user (e.g., send the user an email or message), to take a particular action (e.g., call a smart contract, pause a monitored object, or call an application programming interface (API) hook), or both.

FIG. 1 illustrates an example monitoring system 100 for blockchain monitoring, in accordance with certain aspects of the present disclosure. The monitoring system 100 may include storage 116 and processor 114. The storage 116 can include any storage device(s) for storing data. The storage 116 can store data from any of the components of the monitoring system 100.

The monitoring system 100 may be implemented to monitor a blockchain. A blockchain is a model for a distributed, trusted, shared, ledger in which users may store transactions. Each transaction is encrypted and identified by a cryptographic signature that is chained to a previous block through additional cryptographic keys. This allows for the blockchain to be a shared, immutable source of truth as each block stores a hash or signature of the previous block. Thus, any change to a block would require recalculating all subsequent blocks and updating the entire chain.

In some implementations, the processor 114 can include a central processing unit (CPU), a graphics processing unit (GPU), a digital signal processor (DSP), any combination thereof, or other type of processor. As shown, monitoring system 100 may include block detection engine 112, an authentication code database 132, a rules database 108, actions engine 110, and rules evaluation engine 118. As shown, a user 102 may access the monitoring system through a network 130 and configure the monitoring system to monitor the blockchain 104 with respect to a private key (e.g., or any signing key which may be represented in any form including a recovery phrase) associated with the user (e.g., assigned to the user when the user is registered with the monitoring system). To facilitate the monitoring, the user 102 may provide an authentication code to the monitoring system, which may be stored in the authentication code database 132. As described, the authentication code may be a feature of the blockchain 104 that allows a user to provide access to one or more functions for the user without having to share the user's private key. In some aspects, the authentication code may be referred to as a logic signature. The authentication code may be derived from a private key of the user for the blockchain. For instance, in response to a user request, the blockchain may derive the authentication code based on the user's private key. This key derivation function may comprise multiple steps by an algorithm, such as a cryptographic hash function or block cipher.

The block detection engine 112 may monitor the blockchain and detect any new blocks on the chain. Once a new block is detected, the rules evaluation engine 118 may retrieve one or more rules from the rules database 108 and determine whether the rules apply to the detected block for the user. The rules stored in the database may be specific to and configured by each user for monitoring the chain with the user's authentication code. The rules database 108 may also store one or more actions associated with each rule. Once a specific rule is detected to apply as determined by the rules evaluation engine 118, the actions engine 110 may perform or execute the one or more actions associated with the rule.

In some aspects, block detection engine 112, actions engine 110, and rules evaluation engine 118 may be implemented as part of the processor 114 and/or implemented as instructions in storage 116. The block detection engine 112, actions engine 110, and rules evaluation engine 118 may be implemented in hardware, software, or a combination of hardware and software. In some aspects, the block detection engine 112, actions engine 110, and rules evaluation engine 118 may be implemented by or in the same hardware, software, or combination of hardware and software (e.g., by a same processor). In some aspects, the block detection engine 112, actions engine 110, and rules evaluation engine 118 may be implemented by or in separate hardware, software, or combination of hardware and software.

Figure 2:
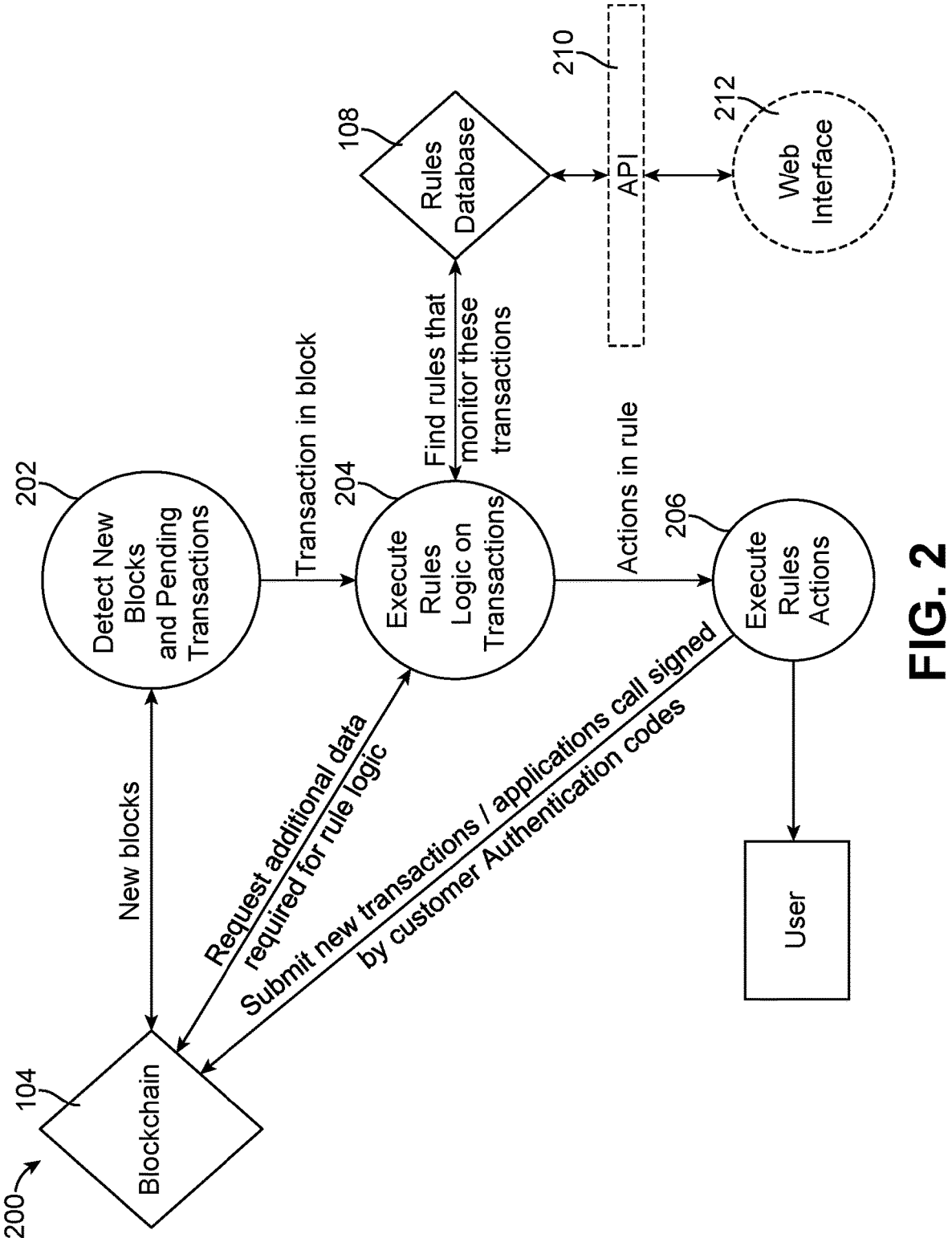
FIG. 2 illustrates example operations for blockchain monitoring, in accordance with certain aspects of the present disclosure.

FIG. 2 illustrates example operations 200 for blockchain monitoring, in accordance with certain aspects of the present disclosure. Operations 200 may be performed, for example, by monitoring system 100 described with respect to FIG. 1. At block 202, the monitoring system detects a new block and pending transactions of the new block on blockchain 104. The new block may be detected via the block detection engine and using a blockchain application programming interface (API). The transactions of the detected block may be provided to the rules evaluation engine 118. At block 204, the rules evaluation engine 118 performs or executes rules logic on the transactions.

As described herein, the rules evaluation engine 118 that may be backed by a rules database 108. For example, the rules evaluation engine may find, from the rules database 108, rules for monitoring the transactions. In some aspects, the rules database may be populated by a user via an API 210 and through a web interface 212. For each transaction of each new block, the rules evaluation engine 118 finds the rules in the database that monitor the new block. The transactions on the block may be matched against the monitored object of the rules. For example, a transaction in which account A transfers 10 units of asset Z to account B may result in pulling from the rules database the rules that monitor accounts A and/or B, and/or rules that monitor asset Z.

The rules evaluation engine 118 then performs or executes the logic of the retrieved rules. In some aspects, the logic may rely on external data, and the rules evaluation engine 118 may request additional data from the blockchain 104 that may be used for rule logic. For instance, at block 204, the rules evaluation engine may request additional data for the blockchain that the rules evaluation engine may use to evaluate the rule for a particular transaction. As one example, the logic may rely on the global state of a smart contract stored on the chain. Therefore, the rules evaluation engine may retrieve external data (e.g., the global state of the smart contract) before executing the logic. As another example, a particular rule may require determining whether a counter associated with the smart contract is higher than a threshold. Thus, the rules evaluation engine may request that the blockchain provide an indication of the counter for the smart contract, allowing the rules evaluation engine to determine whether the logic associated with the rule has been met. Other examples of additional data may include an amount of money associated with a contract, a state of a contract, or a value of an asset.

As described, the monitoring system 100 may include an actions engine 110. Each time a transaction matches the logic of a rule, the actions defined in that rule are performed or executed by actions engine 110 at block 206. These actions may rely on calling an external service, such as sending a notification by sending an email to a mail server, contacting a blockchain node to submit a transaction, or blocking further transactions. As shown, a web interface 212 may be used by a user to select objects to monitor and define the corresponding rules.

The monitoring system described herein allows a user to take preventive or corrective actions on the blockchain when a transaction that matches a configured rules is detected. An example use case for the monitoring system includes automatically putting a smart contract on pause when a transaction that violates a condition is detected or updating the smart contract to remove a mechanism that can change the contract state. For example, a user may configure the monitoring system to detect, using a particular rule, whether the ratio of assets in a liquidity pool starts to be unbalanced and automatically pause the operations of the pool until a human can verify that the activity is legit. In some aspects, a second order logic may be used (e.g., via machine learning or artificial intelligence) to determine whether a human flag (e.g., human review) is necessary. As another example, a rule may monitor a value (e.g., sale price) associated with an asset (e.g., non-fungible token (NFT)). If the value of the asset goes below a certain price, the rule may indicate to buy the asset as the corresponding action.

As described herein, the performance of an action on the blockchain for a user may be facilitated using an authentication code. For example, when a user registers a new rule, the monitoring system may provide the user with logic that enables the monitoring system to execute a function the user wants in accordance with the new rule. The user then signs that logic and gives the monitoring system the signature (referred to herein as an authentication code). Using the authentication code, the monitoring system later executes the function in the user's name automatically. The advantage is that the user does not need to modify these functions to work with the monitoring system, and simply generates an authorization to delegate the access to these functions.

Figure 3:
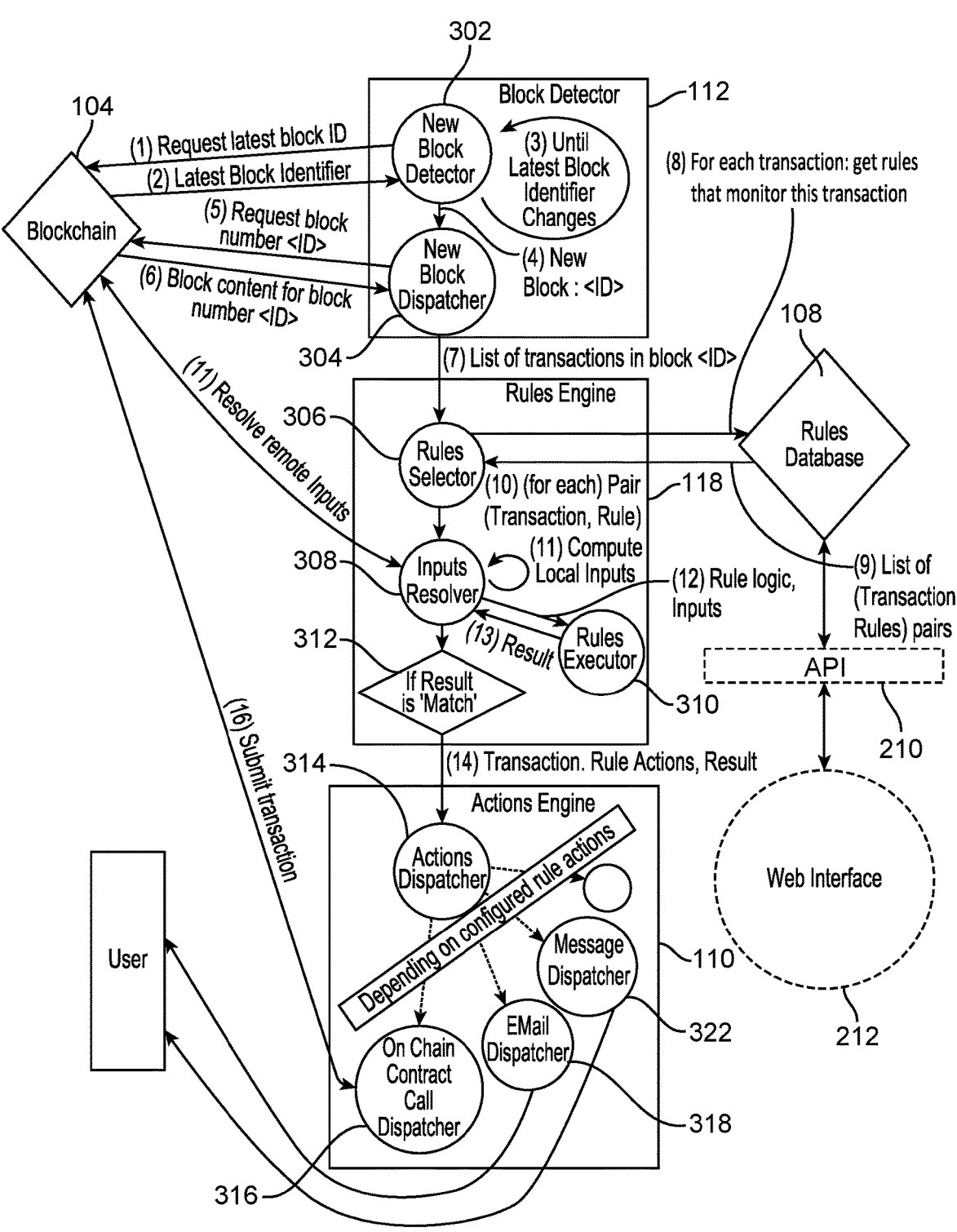
FIG. 3 illustrates an example implementation of a monitoring system, in accordance with certain aspects of the present disclosure.

FIG. 3 illustrates an example implementation of the monitoring system 100, in accordance with certain aspects of the present disclosure. As shown, the monitoring system 100 includes the block detection engine 112 which may include a new block detector 302 and new block dispatcher 304. The new block detector 302 may monitor for a new block on the blockchain 104 by sending to the blockchain 104 a request for the latest block identifier (ID) on the blockchain and receiving the latest block ID in response to the request, as shown. The new block detector 302 may continue to monitor the blockchain until the latest block ID changes, indicating that a new block has been created. The new block ID may be sent to a block dispatcher 304 which may send a request to the blockchain 104 with a block number (e.g., block ID) and receive the block content associated with the block number, as shown. The list of transactions (e.g., block content) associated with the block ID may be sent to a rule selector 306 of the rules evaluation engine 118. For each transaction, the rule selector 306 accesses the database and obtains the rules associated with the transaction. For instance, the rule associated with a recipient or a sender associated with a transaction may be obtained, or a rule associated with a particular application call associated with a transaction may be obtained.

For each pair of transaction and rule, an inputs resolver 308 of the rules evaluation engine 118 may compute local inputs that may be necessary for evaluating the rule for the transaction. The inputs resolver may resolve remote inputs from the blockchain 104. For instance, as described with respect to FIG. 2, the rules evaluation engine 118 may request additional data for the blockchain that the rules evaluation engine may use to evaluate the rule for a particular transaction. Examples of additional data may include an amount of money associated with a contract, a state of a contract, or a value of an asset, as described herein. The additional data may be any information available in transactions on the blockchain. For instance, a rule may be triggered when a specific transaction occurs but dependent on whether the average transaction amount in the past 24 hours on a specific contract address is above a certain threshold. Thus, the average transaction amount in the past 24 hours may be additional data used to evaluate the rule. The additional information may include any metadata contained in a smart contract, which can be arbitrary data or attributes in a transaction.

The rules logic and inputs may be provided to a rules executor 310 which performs or executes the rule using the inputs and provides the results of the rule execution to the inputs resolver 308. At block 312, if the inputs resolver 308 indicates a match for the rule, the transaction and rule actions (e.g., and in some cases, results of the rule execution) may be provided to an actions dispatcher 314. Depending on the configured rules actions, the actions dispatcher 314 may dispatch various actions to occur. For example, at block 316, an on-chain contract call dispatcher may submit a transaction to the blockchain. As another example, at block 318, an email dispatcher may send an email to the user for notification. As yet another example, at block 322, a message dispatcher may send a message to the user using a messaging service or a message may be sent to a second order logic for further analysis.

FIG. 4 illustrates example operations 400 for blockchain monitoring, in accordance with certain aspects of the present disclosure. The operations 400 may be performed, for example, by a monitoring system, such as the monitoring system 100.

At block 402, the monitoring system detects (e.g., via block detection engine 112) a block on a blockchain (e.g., blockchain 104). At block 404, the monitoring system retrieves (e.g., via rules evaluation engine 118) from a rules database (e.g., rules database 108) a rule associated with one or more transactions on the block. At block 406, the monitoring system determines (e.g., via rules evaluation engine 118) whether the rule applies to one or more transactions on the block. In some aspects, the monitoring system may receive, via the rules evaluation engine, information associated with the one or more transactions and determines whether the rule applies to the one or more transactions based on the information. In some aspects, the monitoring system receives, from the user, the rule associated with the one or more transactions, and stores the rule in the rules database to be used for monitoring the blockchain for the user.

In some aspects, determining whether the rule applies to the one or more transactions includes monitoring an object associated with the one or more transactions. The object may be at least one of a smart contract on the blockchain, an account on the blockchain, or a standard asset on the blockchain.

In some aspects, the rule includes whether an amount associated with the one or more transactions meets a threshold. For example, the amount may be a cryptocurrency that was exchanged in the one or more transactions, or as another example, a value of an asset associated with the one or more transactions.

At block 408, the monitoring system performs (or executes) one or more actions associated with the rule using an authentication code associated with the user. As described herein, the authentication code may be different than a private key of the user for accessing the blockchain. In some aspects, the monitoring system also receives, from the user, the authentication code to be used for monitoring the blockchain for the user.

In some aspects, executing the one or more actions may include sending a notification to the user. In some cases, executing the one or more actions may include submitting a transaction to the blockchain. In some implementations, executing the one or more actions includes blocking one or more other transactions on the blockchain.

Figure 5:
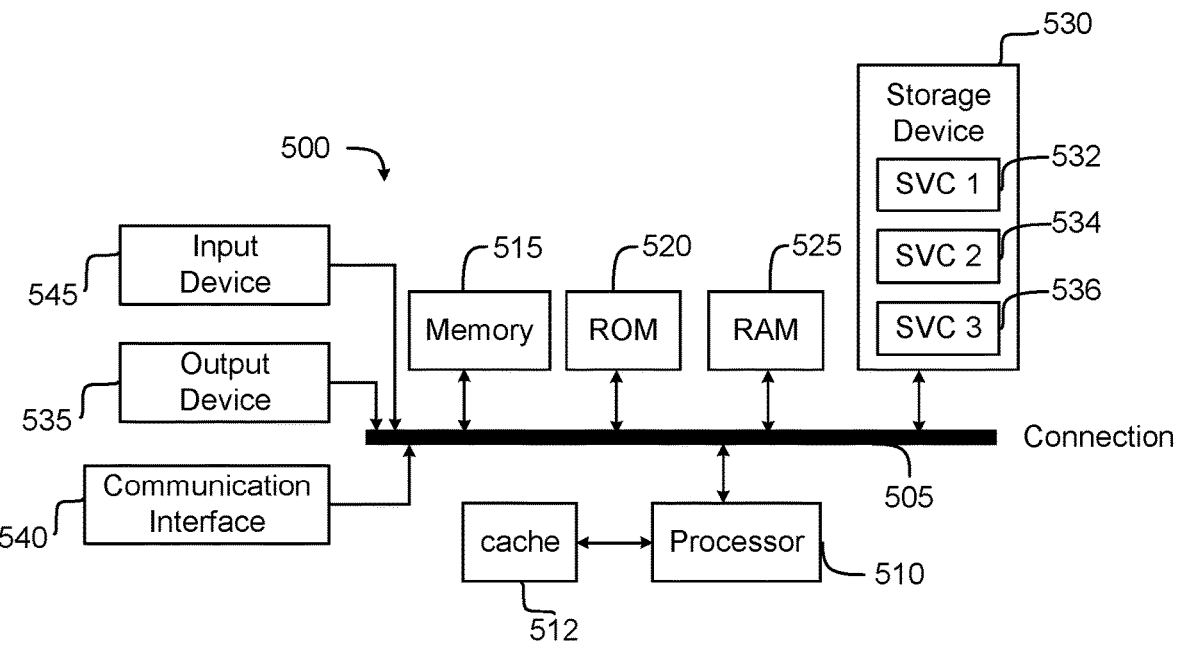
FIG. 5 illustrates an architecture of a computing system.

FIG. 5 illustrates an architecture of a computing system 500 wherein the components of the system 500 are in electrical communication with each other using a connection 505, such as a bus. Exemplary system 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable client interaction with the computing system 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a client to provide multiple types of input to communicate with the computing system 500. The communications interface 540 can generally govern and manage the client input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the concepts in this disclosure may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" or "one or more of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules.

Illustrative Aspects of the present disclosure include:

Aspect 1. A method for blockchain monitoring, comprising: detecting a block on a blockchain; retrieving, from a rules database, a rule associated with one or more transactions on the block; determining whether the rule applies to one or more transactions on the block; and performing one or more actions associated with the rule using an authentication code associated with a user, the authentication code being different than a private key of the user for accessing the blockchain.

Aspect 2. The method of aspect 1, further comprising receiving, from a device associated with the user, the authentication code to be used for monitoring the blockchain for the user.

Aspect 3. The method of one of aspects 1-2, further comprising: receiving information associated with the one or more transactions; and determining whether the rule applies to the one or more transactions based on the information.

Aspect 4. The method of one of aspects 1-3, further comprising: receiving, from a device associated with the user, the rule associated with the one or more transactions; and storing the rule in the rules database to be used for monitoring the blockchain for the user.

Aspect 5. The method of one of aspects 1-4, wherein the rule includes whether an amount associated with the one or more transactions meets a threshold.

Aspect 6. The method of one of aspects 1-5, wherein determining whether the rule applies to the one or more transactions includes monitoring an object associated with the one or more transactions.

Aspect 7. The method of aspect 6, wherein the object includes at least one of a smart contract on the blockchain, an account on the blockchain, or a standard asset on the blockchain.

Aspect 8. The method of one of aspects 1-7, wherein performing the one or more actions includes sending a notification to the user.

Aspect 9. The method of one of aspects 1-8, wherein performing the one or more actions includes submitting a transaction to the blockchain.

Aspect 10. The method of one of aspects 1-9, wherein performing the one or more actions includes blocking one or more other transactions on the blockchain.

Aspect 11. The method of one of aspects 1-10, wherein the authentication code is derived from the private key.

Aspect 12: A computer-readable medium comprising at least one instruction for causing a computer or processor to perform operations according to any of aspects 1 to 11.

Aspect 13: An apparatus including means for performing operations according to any of aspects 1 to 11.

Aspect 14: An apparatus including at least one memory and at least one processor coupled to the at least one memory. The at least one processor is configured to perform operations according to any of aspects 1 to 11.

What is claimed is:

1. A monitoring system, comprising:
at least one memory; and
at least one processor coupled to the at least one memory and configured to:
    request a latest-block identifier from a blockchain;
    based on the latest-block identifier, identify a block on the blockchain;
    detect one or more transactions on the block;
    retrieve, from a rules database, a rule associated with transactions on the block, wherein the rule includes whether an amount associated with the one or more transactions meets a threshold;
    determine whether the rule applies to the one or more transactions on the block based on information from the blockchain;
    perform one or more actions associated with the rule using an authentication code associated with a user, the authentication code being different than a private key of the user for accessing the blockchain; and receive, from a device associated with the user, the authentication code to be used for monitoring the blockchain for the user.

2. The monitoring system of claim 1, wherein the at least one processor is configured to:

receive information associated with the one or more transactions; and determine whether the rule applies to the one or more transactions based on the information.

3. The monitoring system of claim 1, wherein the at least one processor is configured to:

receive, from the device associated with the user, the rule associated with the one or more transactions; and store the rule in the rules database to be used for monitoring the blockchain for the user.

4. The monitoring system of claim 1, wherein, to determine whether the rule applies to the one or more transactions, the at least one processor is configured to monitor an object associated with the one or more transactions.

5. The monitoring system of claim 4, wherein the object includes at least one of a smart contract on the blockchain, an account on the blockchain, or a standard asset on the blockchain.

6. The monitoring system of claim 1, wherein, to perform the one or more actions, the at least one processor is configured to send a notification to the user.

7. The monitoring system of claim 1, wherein, to perform the one or more actions, the at least one processor is configured to submit a transaction to the blockchain.

8. The monitoring system of claim 1, wherein, to perform the one or more actions, the at least one processor is configured to block one or more other transactions on the blockchain.

9. The monitoring system of claim 1, wherein the authentication code is derived from the private key.

10. A method for blockchain monitoring, comprising:

request a latest-block identifier from a blockchain;

based on the latest-block identifier, identify a block on the blockchain;

detecting one or more transactions on the block;

retrieving, from a rules database, a rule associated with transactions on the block, wherein the rule includes whether an amount associated with the one or more transactions meets a threshold;

determining whether the rule applies to the one or more transactions on the block based on information from the blockchain;

performing one or more actions associated with the rule using an authentication code associated with a user, the authentication code being different than a private key of the user for accessing the blockchain; and receiving, from a device associated with the user, the authentication code to be used for monitoring the blockchain for the user.

11. The method of claim 10, further comprising:

receiving information associated with the one or more transactions; and determining whether the rule applies to the one or more transactions based on the information.

12. The method of claim 10, further comprising:

receiving, from the device associated with the user, the rule associated with the one or more transactions; and storing the rule in the rules database to be used for monitoring the blockchain for the user.

13. The method of claim 10, wherein determining whether the rule applies to the one or more transactions includes monitoring an object associated with the one or more transactions.

14. The method of claim 13, wherein the object includes at least one of a smart contract on the blockchain, an account on the blockchain, or a standard asset on the blockchain.

15. The method of claim 10, wherein performing the one or more actions includes sending a notification to the user.

16. A non-transitory computer-readable medium having instructions stored thereon, that when executed by one or more processors, cause the one or more processors to:

request a latest-block identifier from a blockchain;

based on the latest-block identifier, identify a block on the blockchain;

detect one or more transactions on the block;

retrieve, from a rules database, a rule associated with transactions on the block, wherein the rule includes whether an amount associated with the one or more transactions meets a threshold;

determine whether the rule applies to the one or more transactions on the block based on information from the blockchain;

perform one or more actions associated with the rule using an authentication code associated with a user, the authentication code being different than a private key of the user for accessing the blockchain; and receive, from a device associated with the user, the authentication code to be used for monitoring the blockchain for the user.

\* \* \* \* \*